(12) United States Patent
Lai et al.

(10) Patent No.: US 7,034,804 B2
(45) Date of Patent: Apr. 25, 2006

(54) COMPUTER POINTING DEVICE EMPLOYING A MAGNETIC FIELD SOURCE AND MAGNETIC FIELD SENSORS

(75) Inventors: Cheng-Shing Lai, Taipei Hsien (TW); Sa-Yee Wen, Taipei Hsien (TW); Wei-Tung Ko, Nanjing (CN)

(73) Assignee: Inventec Appliances Corp., Taipei (TW)

( * ) Notice: Subject to any disclaimer, the term of this patent is extended or adjusted under 35 U.S.C. 154(b) by 325 days.

(21) Appl. No.: 10/064,046

(22) Filed: Jun. 4, 2002

(65) Prior Publication Data
US 2003/0222851 A1    Dec. 4, 2003

(51) Int. Cl.
*G09G 5/08* (2006.01)
(52) U.S. Cl. .................... 345/163; 345/157; 345/160
(58) Field of Classification Search ........ 345/156–157, 345/163–167, 160; 324/207.2, 207.24, 207.25
See application file for complete search history.

(56) References Cited

U.S. PATENT DOCUMENTS

| | | | | |
|---|---|---|---|---|
| 4,459,578 A | * | 7/1984 | Sava et al. ................... 338/128 |
| 4,540,176 A | * | 9/1985 | Baer ............................ 463/37 |
| 4,825,157 A | * | 4/1989 | Mikan ...................... 324/207.2 |
| 5,259,252 A | * | 11/1993 | Kruse et al. ............ 73/862.391 |
| 5,432,530 A | * | 7/1995 | Arita et al. .................. 345/159 |
| 5,504,502 A | * | 4/1996 | Arita et al. .................. 345/160 |
| 5,525,901 A | * | 6/1996 | Clymer et al. .......... 324/207.21 |
| 5,620,068 A | * | 4/1997 | Garnjost et al. ............. 188/378 |
| 5,831,596 A | * | 11/1998 | Marshall et al. ............ 345/161 |
| 6,025,830 A | * | 2/2000 | Cohen ......................... 345/156 |
| 6,583,784 B1 | * | 6/2003 | Helmbrecht ................. 345/167 |
| 6,606,085 B1 | * | 8/2003 | Endo et al. .................. 345/161 |
| 6,611,139 B1 | * | 8/2003 | Jackson .................... 324/207.2 |
| 6,762,748 B1 | * | 7/2004 | Maatta et al. ............... 345/157 |

* cited by examiner

*Primary Examiner*—Amr A. Awad
*Assistant Examiner*—Leonid Shapiro
(74) *Attorney, Agent, or Firm*—Winston Hsu

(57) ABSTRACT

A pointing device for a computer includes a magnetic field source, a magnetic field sensor, and a flexible member that connects the magnetic field source and the magnetic field sensor. When a user accelerates the pointing device the position of magnetic field source with respect to the magnetic field sensor changes and this positional change is measured by the magnetic field sensor, which outputs corresponding electrical signals. The pointing device further includes a processor that receives the electrical signals output by the magnetic field sensor, generates a corresponding standard location signal of the pointing device, and outputs the location signal to a computer via a transmission system.

15 Claims, 9 Drawing Sheets

COMPUTER POINTING DEVICE EMPLOYING A MAGNETIC FIELD SOURCE AND MAGNETIC FIELD SENSORS

BACKGROUND OF INVENTION

1. Field of the Invention

The present invention relates to a pointing device for a computer, and more specifically to a pointing device for a computer that makes use of a magnetic field source and magnetic field sensors.

2. Description of the Prior Art

Pointing devices such as computer mice are one of the most popular methods of user interaction with a computer. A mouse can be used to position a cursor on a computer screen and to execute commands. There are several popular prior art mouse designs currently available to consumers.

A common prior art mouse design is shown in FIG. 1. A mouse 10 comprises a body 12, buttons 14 disposed on the body 12, and a connector cable 16 attached to the body 12. The connector cable 16 can electronically connect the mouse 10 to a computer. To interact with the computer, a user can move the body 12 across a flat surface and depress the buttons 14.

A cross-sectional view of the mouse 10 is shown in FIG. 2. Disposed inside the mouse 10 is a weighted ball 18 that is able to roll when the mouse 10 is moved across a flat surface, a roller 19 having an attached slotted disk 20, the roller 19 in contact with the weighted ball 18, and a pair of infrared sensors 22 (only one is shown in FIG. 2) that can sense the rotation speed of the slotted disk 20 in a direction parallel to an arrow 28. Normally, a second roller and attached slotted disk and a second pair of infrared sensors are provided to sense the rotation speed of the weighted ball 18 in a second direction perpendicular to the arrow 28 and the plane of FIG. 2, but for clarity, these are not shown in FIG. 2. The infrared sensors 22 are electrically connected to a circuit 24, which processes signals received from the infrared sensors 22. Button switches 26 are triggered by the buttons 14 and are electrically connected to the circuit 24. The circuit 24 generates and outputs digital signals relating to the position of the mouse body 12 and the status of the buttons 14 to the computer via the connector cable 16.

FIG. 2 also illustrates the working principle of the mouse 10 in one dimension. When a user slides the body 12 of the mouse 10 across a flat surface parallel to the arrow 28, a frictional force, also indicated by the arrow 28, is exerted on the weighted ball 18 where it contacts the flat surface. The rotation of the ball 18 causes the roller 19 and slotted disk 20 to rotate. The pair of infrared sensors 22 senses the rotation of the roller 19 as pulses caused by the slotted disk 20 and sends a corresponding signal to the circuit 24. If at this time the user presses the buttons 14, the button switches 26 transmit signals to the circuit 24. The circuit 24 then generates and outputs digital signals relating to the position of the mouse body 12 and the status of the buttons 14. The digital signals are output through the connector cable 16 and into the computer. In this way, the prior art mouse 10 can be used to interface with the computer.

The prior art weighted ball style mouse has several deficiencies. Primarily, a weighted ball will simply not roll if the mouse is not in direct contact with a flat surface. Moreover, the flat surface must have a suitable texture in order for the weighted ball to roll reliably. In addition, this variety of mouse is limited to resolving movement in two dimensions only, in the plane of the flat surface. Finally, the roller and sensor mechanism is susceptible to damage by dust particles and intrusion by other particulates.

Another recently popular prior art mouse design is an optical mouse. The optical mouse comprises a light emitting diode (LED) and an image sensor. As the optical mouse is moved over a flat surface, light emitted by the LED is reflected off the flat surface and back to the image sensor. Image data is then analyzed by a processor to correlate patterns and accordingly determine the direction and speed of the movement of the mouse. The processor then sends digital signals to the computer relating the movement and button status of the mouse.

The prior art optical mouse also has faults similar to the weighted ball style mouse, specifically, a flat surface must be provided from which light can reflect. Consequently, this type of mouse is limited to movement in the plane of the flat surface. In addition, dust or other matter can obstruct the LED or image sensor and cause a malfunction.

Both prior art mouse designs described suffer similar inherent limitations. The first being that contact with a flat surface is necessary. The second limitation being that the sensing elements, which are open to the environment, can be impaired by dust or other potentially harmful matter.

SUMMARY OF INVENTION

It is therefore a primary objective of the claimed invention to provide a pointing device for a computer employing a magnetic field source and magnetic field sensors to solve the problems of the prior art.

Briefly summarized, the preferred embodiment of the claimed invention pointing device comprises a magnetic field source, a magnetic field sensor, and a flexible member that connects the magnetic field source and the magnetic field sensor. The claimed invention also includes a processor that receives electrical signals output by the magnetic field sensor, generates a corresponding location signal of the pointing device, and outputs the location signal to a computer.

According to the preferred embodiment of the claimed invention, the magnetic field source comprises a permanent magnet, and the magnetic field sensor comprises a single hall element having three mutually perpendicular measuring axes capable of measuring a magnitude of a magnetic field generated by the magnetic field source in directions of each measuring axis.

It is an advantage of the claimed invention that contact with a flat surface is unnecessary and that the single hall element provides for three-dimensional movement of the pointing device. It is another advantage that the components of the pointing device are entirely encased in a body and are protected from damage by dust and other matter.

These and other objectives of the claimed invention will no doubt become obvious to those of ordinary skill in the art after reading the following detailed description of the preferred embodiment that is illustrated in the various figures and drawings.

DETAILED DESCRIPTION

The present invention will be described in two embodiments. The preferred embodiment utilizes a hall element having three sensing axes enabling the pointing device to sense three-dimensional movement. The second embodiment includes two hall elements, or alternatively two magnetoresistors, that provide for two-dimensional movement. Using hall elements to produce a current or voltage signal that can be readily understood by an IC circuit is well known in the art. Both embodiments have a computer mouse style body, however, the external design of the present invention is not limiting.

Figure 1:
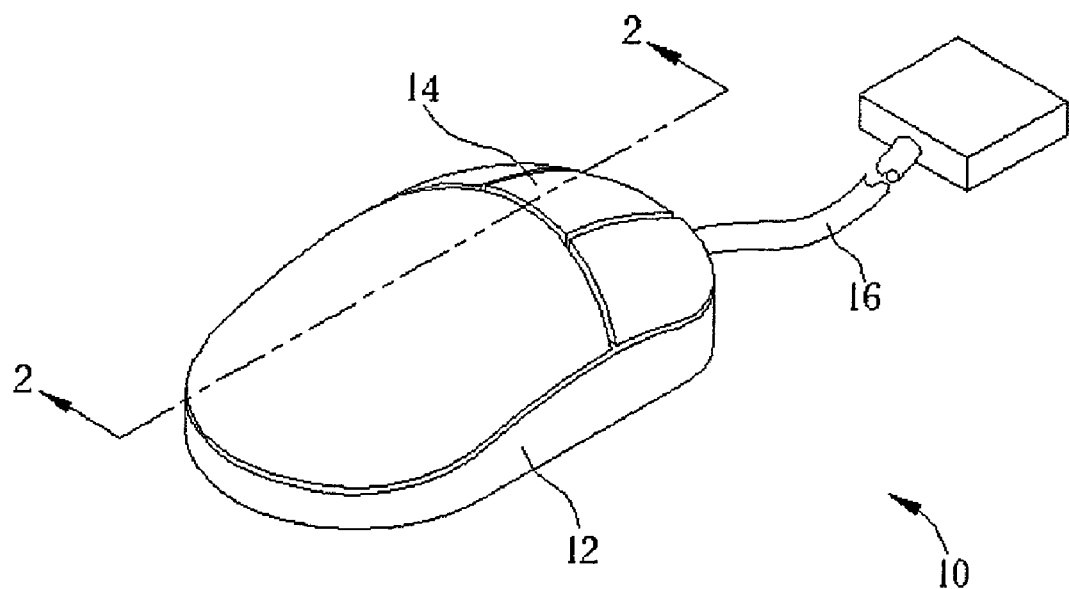
FIG. 1 is a perspective view of a prior art pointing device.
Figure 2:
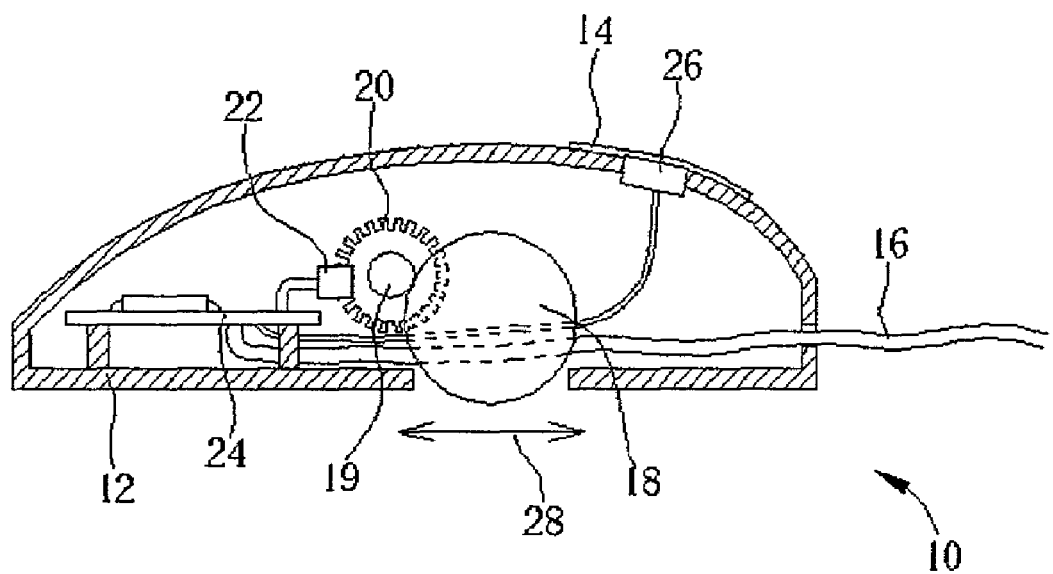
FIG. 2 is a cross-sectional view of the pointing device shown in FIG. 1.
Figure 3:
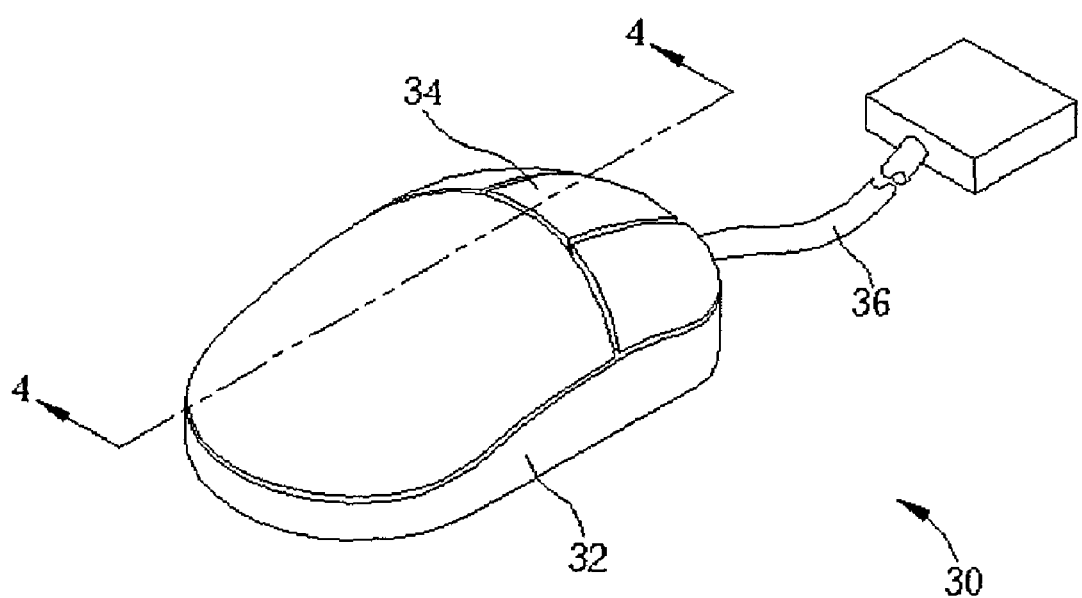
FIG. 3 is a perspective view of a pointing device according to the preferred embodiment of the present invention.

Please refer to FIG. 3, which shows a perspective view of the preferred embodiment pointing device 30. The mouse 30 includes a mouse body 32, buttons 34 disposed on the body 32, and a connector cable 36 attached to the body 32. The connector cable is used to electronically connect the mouse 30 to a computer (not shown). To interface with the computer a user moves the mouse body 32 and depresses the buttons 34.

Figure 4:
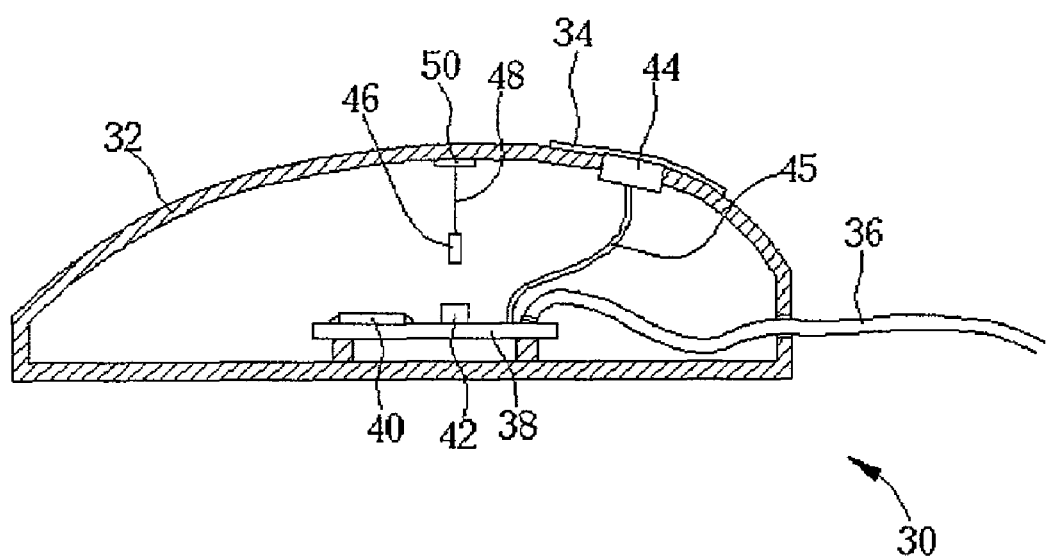
FIG. 4 is a cross-sectional view of the pointing device shown in FIG. 3.

A cross-sectional view of the mouse 30 is shown in FIG. 4. Enclosed inside the mouse body 32 is a circuit 38 including a processor 40. Also disposed on the circuit 38 is a magnetic field sensor, which in the preferred embodiment is a three-axis hall element 42. The hall element 42 is powered by the circuit 38 and outputs electronic signals to the processor 40. The circuit 38 provides electrical connections and wires 45 for button switches 44 that are mechanically connected to the buttons 34 and sense the position of the buttons 34, and the connector cable 36 that connects the mouse 30 to the computer. Power for the mouse 30 and signals between the mouse 30 to the computer are transmitted through the connector cable 36. Situated directly above the hall element 42 is a magnetic field source, in the preferred embodiment a permanent magnet 46, disposed at one end of a flexible member, which in the preferred embodiment is a dampened spring 48 (illustrated schematically in FIG. 4). Besides using a permanent magnet, a solenoid with or without a core could be used. The spring 48 is fixed at a second end to a support 50, which is embedded into the mouse body 32. The spring 48, support 50, and magnet 46 are designed such that the system is as close to critically dampened as possible, such that when the user accelerates the mouse body 32 in any direction, the relative position of the permanent magnet 46 with respect to the hall element 42 changes in a predictable manner with oscillations being minimized.

Figure 5:
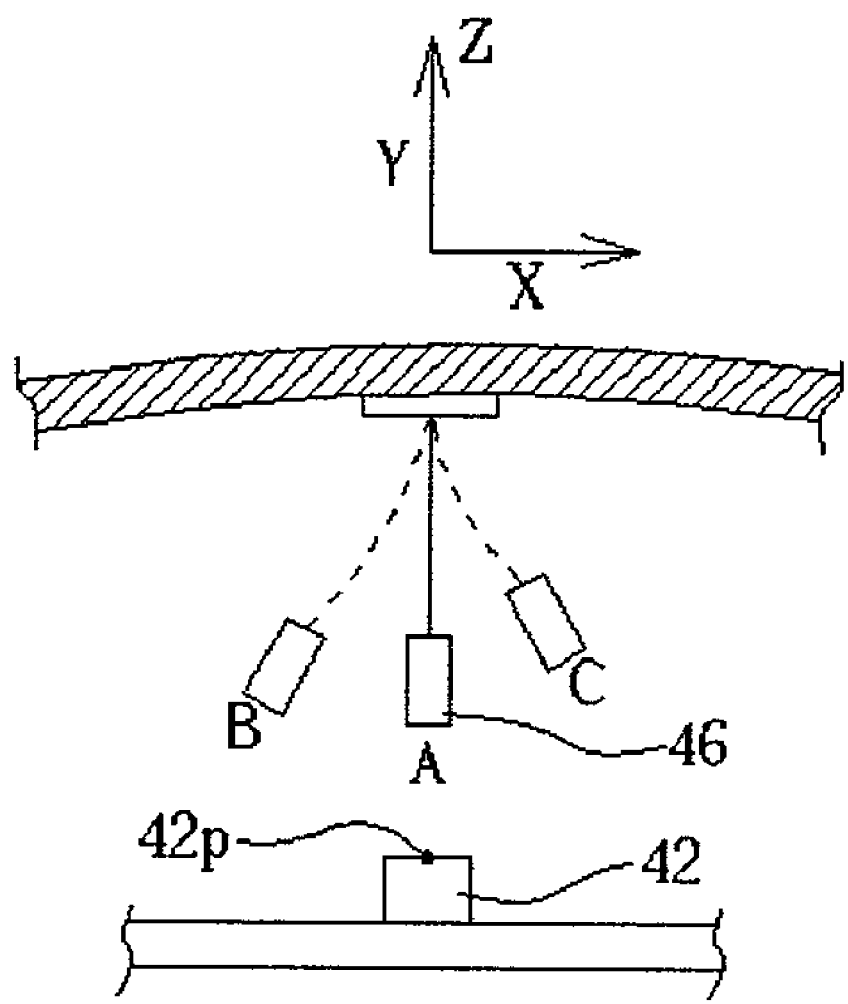
FIG. 5 is a schematic diagram of the permanent magnet and the hall element shown in FIG. 4.

FIG. 5 illustrates several positions in an X–Z plane of the permanent magnet 46 with respect to a sensing point 42p of the three-axis hall element 42. The sensing point 42p is where the hall element 42 measures the magnitude of the magnetic field generated by the magnet 46 in the three mutually perpendicular directions X, Y, and Z. While it is not necessary for the measuring directions X, Y, and Z to be mutually perpendicular, it is preferred since this gives the hall element 42 maximum sensitivity. Position A of the magnet 46 represents no force being exerted on the mouse body 32 by the user, that is to say the mouse body 32 is stationary or moving with a constant velocity. Position B shows the location of the magnet 46 when the user accelerates the mouse body 32 in a positive X direction. The magnet 46 moves to position C when the user accelerates the mouse in a negative X direction and a negative Z direction. As the mouse body 32 is accelerated by the user, the inertia of the magnet 46 is what causes it to move from position A to positions B and C. The magnet 46 can move continuously in the X, Y, and Z directions, and the Y direction is only omitted in this description for clarity. As mentioned in the previous paragraph, the movement of the magnet 46 is essentially critically dampened, so that it does not oscillate between the positions A and B, A and C, or any other positions.

Figure 6:
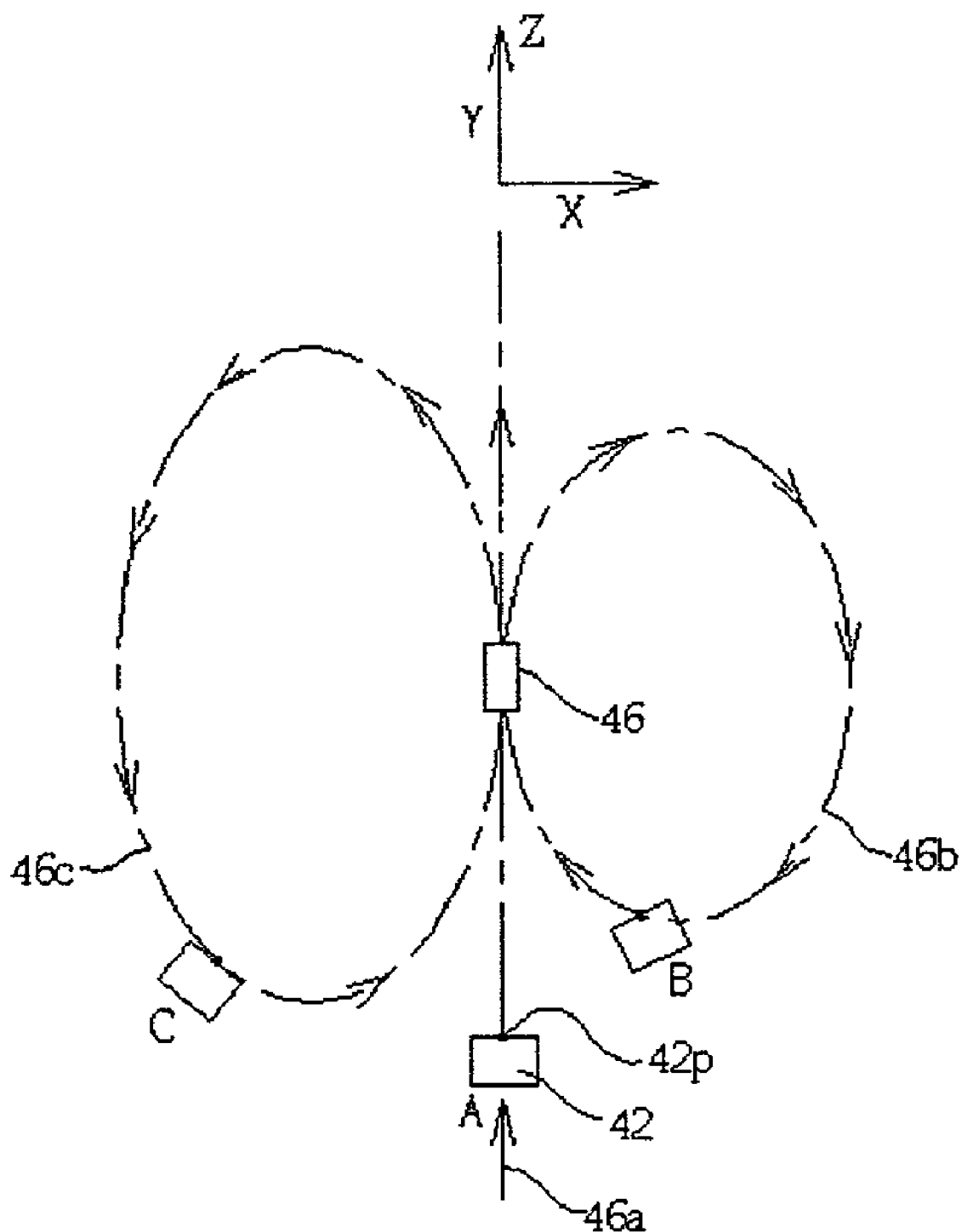
FIG. 6 is a schematic diagram of magnetic interaction of the permanent magnet and the hall element shown in FIG. 5.

Magnetic interaction of the permanent magnet 46 and the three-axis hall element 42 is illustrated in FIG. 6. For descriptive purposes, the positions A, B, and C of magnet 46 relative to the hall element 42 are illustrated as the hall element 42 at positions A, B, and C with respect to the magnet 46 being fixed. At position A, the hall element 42 responds to a magnetic field line of flux 46a passing through the sensing point 42p. The flux line 46a has a positive component in the positive Z direction and zero components in both the X and Y directions. When the hall element 42 is at the position B relative to the magnetic field of the magnet 46, a flux line 46b passes through the sensing point 42p. The flux line 46b has a positive Z component and a negative X component. Similarly, when the hall element 42 is at the position C relative to the magnetic field, a flux line 46c affects the sensing point 42p. The flux line 46c has a positive X component and a negative Z component as shown in FIG. 6. Both the positions B and C have no component in the Y direction, however, the hall element 42 is fully capable of measuring Y components of the magnetic field. The Y component is simply ignored in this description for the sake of simplicity. The hall element 42 senses the components of the magnetic field generated by the magnet 46 in all three directions X, Y, and Z and generates a corresponding acceleration signal. Because of the geometry of the magnetic field in a region around the hall element 42, the acceleration signal produced by the hall element 42 has a one-to-one relationship with the position of the magnet 46 relative to the hall element 42. Accordingly, this signal effectively represents the three-dimensional acceleration of the mouse body 32.

Once the acceleration of the mouse body 32 is measured by the three-axis hall element 42 and output to the processor 40 as the corresponding acceleration signal, the processor 40 must perform an integration on the acceleration signal. The integration performed by the processor 40 is in effect a double integration to calculate the instantaneous position of the mouse body 32. It is well known in the art how to perform this type of integration using an IC circuit such as the processor 40. Calibration constants are incorporated into said integration, either as constant values or as factors, when the present invention mouse 30 is calibrated, and default values are provided in lieu of these. The processor finally outputs a standard location signal to the computer through the connector cable 36.

Generally, when a user accelerates the mouse body 32, the position of the permanent magnet 46 relative to the three-axis hall element 42 is changed by way of the dampened spring 48. While the change of this relative position does not necessarily have a liner relationship with acceleration applied by the user, the relationship is certainly one-to-one. The hall element 42 senses the magnitude of the magnetic field provided by the magnet 46 in three component directions and outputs an acceleration signal that corresponds to the actual three-dimensional acceleration of the mouse body 32 by the user. The acceleration signal output by the hall element 42 is integrated by the processor 40 into a location signal referencing calibration constants. At the same time, the processor 40 accepts input from the button switches 44. The location signal and button signals are assembled by the processor into a standard pointing device signal, which is readily understood by the computer, that is then transmitted to the computer by the connector cable 36. In this way, the preferred embodiment of the present invention mouse 30 can be operated by the user to control the computer.

Figure 7:
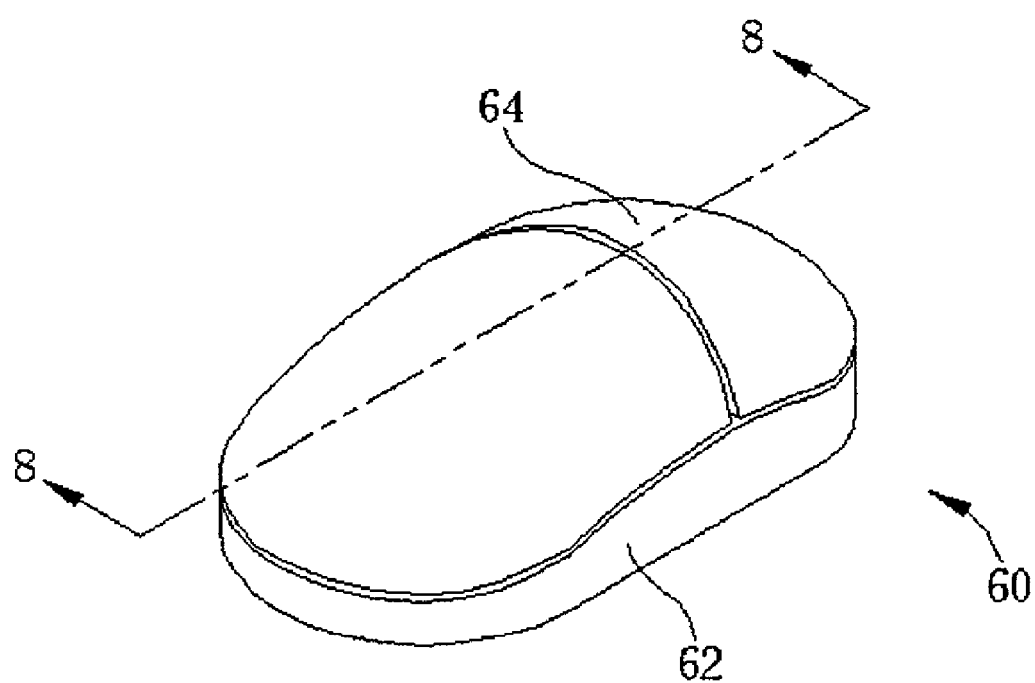
FIG. 7 is a perspective view of a pointing device according to a second embodiment of the present invention.

The second embodiment of the present invention is shown in FIG. 7. A mouse 60 comprises a body 62 and a button 64. As in the preferred embodiment, a user moves the mouse body 62 and depresses the button 64 to control a computer (not shown).

Figure 8:
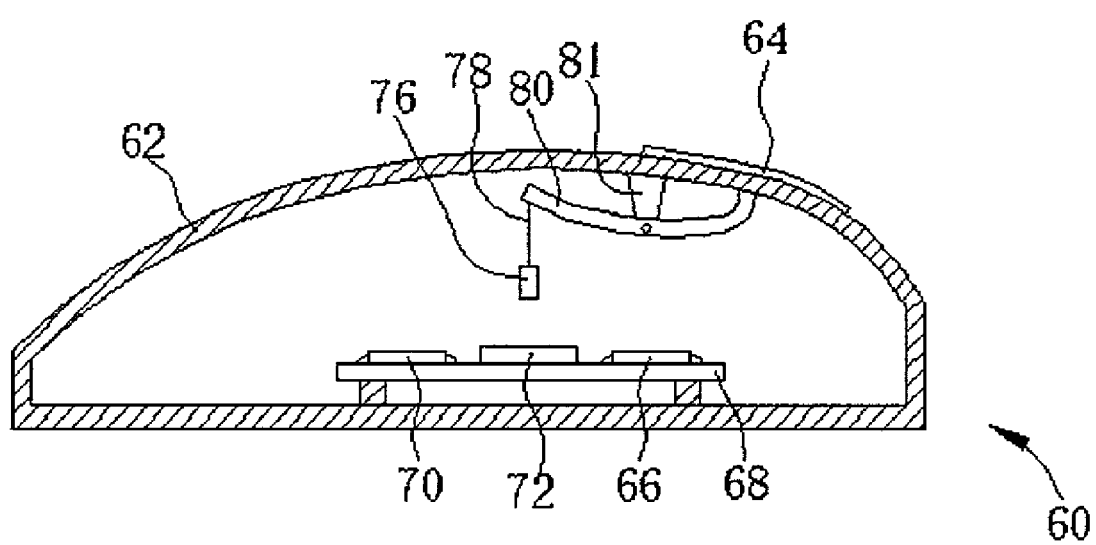
FIG. 8 is a cross-sectional view of the pointing device shown in FIG. 7.

A cross-sectional view of the second embodiment of the present invention is shown in FIG. 8. Enclosed in the mouse body 62 is located a circuit 68 including a processor 70. Also disposed on the circuit 68 is a magnetic field sensor 72. The sensor 72 is powered by the circuit 68 and outputs electronic signals to the processor 70. The circuit 68 also comprises a wireless transmission module 66 that allows the mouse 60 to communicate with the computer through radio or microwave transmission. Power for the mouse 60 and signals between the mouse 60 and the computer are transmitted via the transmission module 66. Alternatively, the mouse 60 could have a self-contained power supply, and then only signals would be transmitted and received by the wireless transmission module 66. Situated directly above the sensor 72 is a permanent magnet 76 disposed at one end a dampened flexible wire 78 that can bend resiliently (illustrated schematically in FIG. 8). The wire 78 is fixed at a second end to a lever 80, which is mechanically connected to the mouse button 64 and pivot connected to a pivot 81. The pivot 81 is fixed to the mouse body 62. The wire 78, lever 80, and magnet 76 are designed such that the system is as close to critically dampened as possible, such that when the user accelerates the mouse body 62 in any direction, the relative position of the permanent magnet 76 with respect to the sensor 72 changes in a predictable manner with oscillations being minimized.

Figure 9:
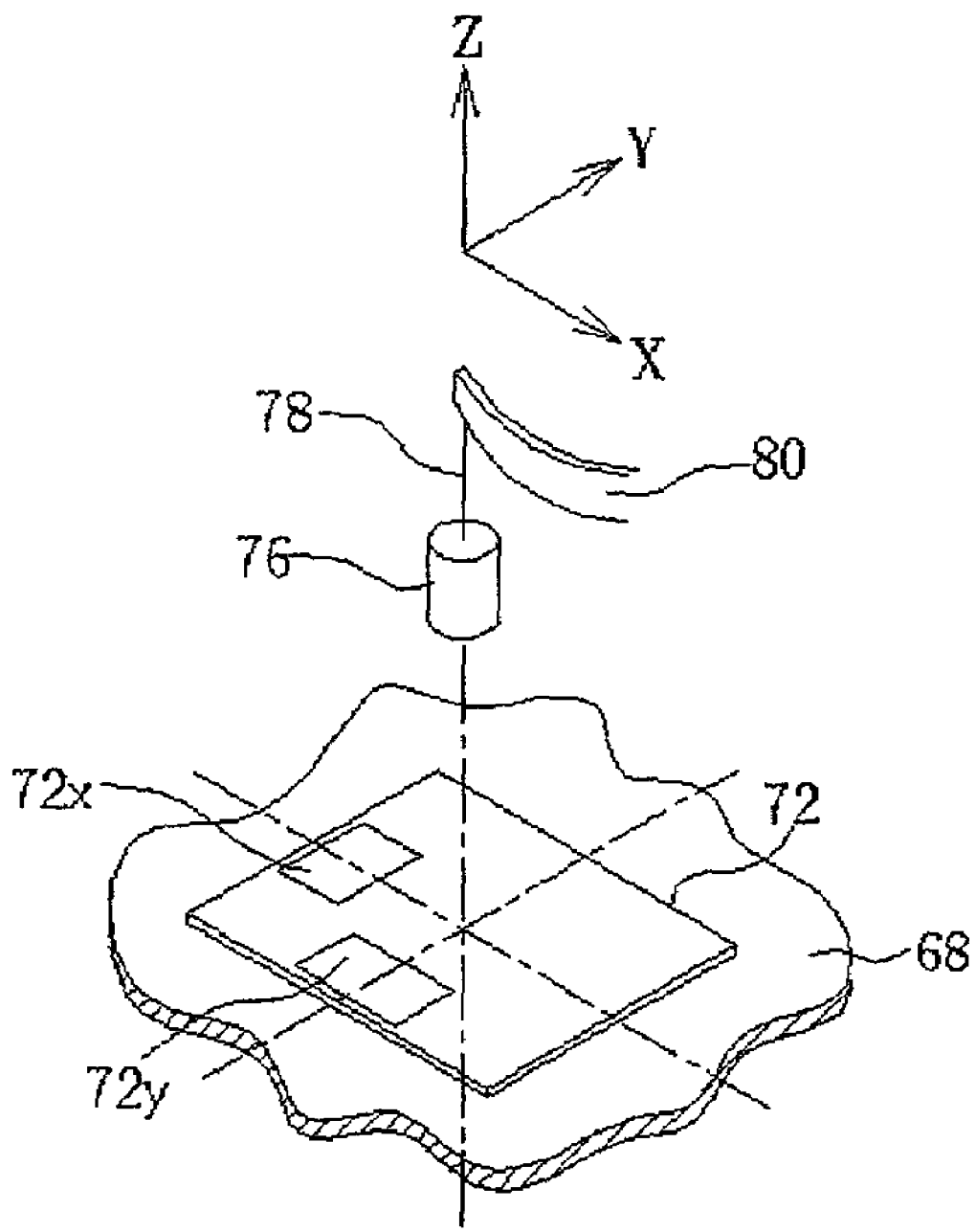
FIG. 9 is a schematic diagram of the permanent magnet and the sensor shown in FIG. 8.

A schematic diagram of the permanent magnet 76 and the magnetic field sensor 72 is shown is FIG. 9. When the mouse body 62 is accelerated by the user in an X–Y plane, the magnet 76 moves with a resilient pendulum-like movement, which is approximately confined to an X–Y plane. Magnetic sensor elements 72$x$ and 72$y$ in the sensor 72 detect this movement as an increased or decreased magnetic field strength in corresponding sensing directions. The sensor elements 72$x$ and 72$y$ are one-dimensional hall elements, or alternatively magnetoresistors. In particular, the hall element 72$x$ detects the magnetic field strength in an X direction and outputs a signal to the processor 70 accordingly. When the magnet 76 is moved in the negative X direction the signal output by the hall element 72$x$ is proportional to this movement and opposite another movement of the magnet 76 in the positive X direction. In this way, the hall element 72$x$ can determine the position of the magnet 76 and consequently the acceleration of the mouse body 62. The same is true for the hall element 72$y$, which operates under the exact same principle but with respect to a Y direction. Note that the directions X and Y are mutually perpendicular for maximum sensitivity, however, the second embodiment will function, albeit with less desirable results, as long as the directions X and Y nonparallel. Regardless of the specific sensor element and arrangement used, the sensor 72 can detect the two dimensional acceleration of the mouse body 62 in an X–Y plane by measuring changes in the X and Y components of the magnetic field generated by the permanent magnet 76.

Referring back to FIG. 8, if the user presses the button 64 the lever 80, pivoting about the pivot 81, acts to raise the permanent magnet 76 in a Z direction and thus further from the magnetic field sensor 72. The hall elements 72$x$ and 72$y$ are still able to distinguish X–Y movements of the magnet 76, but the overall magnetic field strength detected by the sensors is decreased. This has the effect of uniformly attenuating the signals of the hall elements 72$x$ and 72$y$. The careful arrangement of the magnet 76, the pivot 81, and the sensor 72 ensures that the raising of the magnet 76 is not mistakenly interpreted by the sensor 72 as an X–Y movement of the magnet 76. In this way, the second embodiment of the present invention mouse 60 detects that the button 64 has been depressed.

The magnetic field sensor 72 outputs a combination acceleration-button signal to the processor 70. As in the preferred embodiment, the processor 70 integrates the acceleration part of the signal to generate a location signal. The processor 70 then outputs this location signal along with a button signal, both in a standard form, to the computer via the wireless transmission module 66.

Generally, when a user accelerates the mouse body 62, the position of the permanent magnet 76 relative to the hall elements 72$x$ and 72$y$ of the magnetic field sensor 72 is changed by way of the dampened flexible wire 78. While the change of this relative position does not necessarily have a liner relationship with the acceleration applied to the mouse body 62 by the user, the relationship is nonetheless one-to-one. The sensor 72 outputs a two-dimensional acceleration signal that corresponds to the actual two-dimensional acceleration of the mouse body 62. The acceleration signal is attenuated if the button 64 is depressed, and thus contains information relating to the position of the button 64 that does not obscure the original acceleration information. The acceleration component of the acceleration signal is integrated by the processor 70 into a location signal referencing calibration constants. A standard pointing device signal, having position and button components and is readily understood by the computer, is then transmitted to the computer by the wireless transmission module 66. Thus, the second embodiment of the present invention mouse 60 can be operated by the user to control the computer.

Certain design variations are possible with reference to the above descriptions of the two embodiments. First, the size, shape, and exact position of the permanent magnet can be altered based on different design requirements. Likewise, if a solenoid was to be used instead of the magnet, the associated parameters such as diameter, length, voltage, and number of coils could be varied. Second, the stiffness, dampening, and geometry of the spring or wire can be changed to achieve the desired results. A logical extension of the spring or wire, such as a system of springs or wires, could also be used. Third, the exact design, quantity, position, and sensitivity of the magnetic field sensor can be varied to according to the required design. Fourth, the locations of the magnetic field source and the magnetic field sensor can be exchanged such that the source is fixed and the sensor moves when the mouse is accelerated. Finally, combinations of the two embodiments, such as the preferred embodiment mouse having a wireless transmission module rather than a connector cable are also possible.

In contrast to the prior art, the present invention comprises a mouse body that encloses all the components of the mouse to prevent damage to the components from dust and other particles. Furthermore, the present invention magnetic field source and magnetic field sensor allow the mouse to interface with a computer without requiring a flat two-dimensional surface. In addition, the preferred embodiment of the present invention mouse allows movement to be measured in three-dimensions thus increasing the functionality of the computer. Finally, the second embodiment of the present invention provides a button that does not require a button switch.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A pointing device for a computer comprising:
   a body;
   a magnetic field source for generating a magnetic field having a direction relative to a measurement location and a magnitude proportional to a distance between the magnetic field source and the measurement location;
   a magnetic field sensor for measuring the magnitude and direction of the magnetic field generated by the magnetic field source at a measurement location, and outputting an electrical signal corresponding to the magnitude and direction of the magnetic field at the measurement location;
   a flexible member for allowing and controlling a relative movement of the magnetic field source and the magnetic field sensor, a first end of the flexible member being connected to the body and a second end of the flexible member capable of swinging freely, the flexible member and magnetic field source forming a critically dampened system such that when a force is applied to an end of the flexible member the relative position of the magnetic field sensor with respect to the magnetic field source is changed in a direction of the force by a distance proportional to the force;
   a processor for receiving the electrical signals output by the magnetic field sensor, and generating a corresponding location signal of the pointing device; and
   a transmission system for conveying the location signal from the processor to the computer.

2. The pointing device of claim 1 wherein the magnetic field source comprises a permanent magnet or solenoid.

3. The pointing device of claim 1 wherein the magnetic field sensor comprises at least two hall elements each having a measuring axis and each capable of measuring the magnitude of the magnetic field at the measurement location in a direction of the measuring axis, the hall elements arranged so that the measuring axes are not parallel.

4. The pointing device of claim 1 wherein the magnetic field sensor comprises a single hall element having at least two mutually perpendicular measuring axes capable of measuring the magnitude of the magnetic field directions of each measuring axis at the measurement location.

5. The pointing device of claim 1 wherein the magnetic field sensor comprises at least two magnetoresistors each having a measuring axis and each capable of measuring the magnitude of the magnetic field at the measurement location in a direction of the measuring axis, the magnetoresistors arranged so that the measuring axes are not parallel.

6. The pointing device of claim 1 wherein the flexible member is a dampened spring that can bend, compress, and extend.

7. The pointing device of claim 1 wherein the flexible member is a wire that can bend resiliently.

8. The pointing device of claim 1 further comprising at least a button.

9. The pointing device of claim 8 wherein the button is mechanically connected to the flexible member and is capable of changing the relative position of the magnetic field sensor with respect to the magnetic field source, and thus modifying the electrical signal output by the magnetic field sensor to comprise a button signal.

10. The pointing device of claim 1 wherein the transmission system is a connector cable or a wireless transmission module.

11. The pointing device of claim 1 wherein the measurement location is the origin of measurement axes of the magnetic field sensor.

12. The pointing device of claim 1 wherein the flexible member and magnetic field sensor form a critically dampened system.

13. The pointing device of claim 1 wherein the flexible member comprises a dampened element and a support.

14. The pointing device of claim 1 wherein the second end of the flexible member is connected to the magnetic field source; the magnetic field sensor is connected to a circuit which is in turn connected to the body, the magnetic field sensor being positioned such that it can sense the magnetic field of the magnetic field source.

15. The pointing device of claim 1 wherein a first end of the flexible member is connected to the body and a second end of the flexible member is connected to the magnetic field sensor; the magnetic field source is connected to a mounting means which is in turn connected to the body, the magnetic field sensor being positioned such that it can sense, the magnetic field of the magnetic field source.

* * * * *